United States Patent [19]
Bodine

[11] 3,717,427
[45] Feb. 20, 1973

[54] SONIC APPARATUS FOR WORKING PLASTIC MATERIAL

[76] Inventor: Albert G. Bodine, 7877 Woodley Avenue, Van Nuys, Calif. 91406

[22] Filed: Dec. 3, 1970

[21] Appl. No.: 94,663

Related U.S. Application Data

[63] Continuation-in-part of Ser. Nos. 845,865, July 29, 1969, abandoned, and Ser. No. 454,335, May 10, 1965, abandoned, each is a continuation-in-part of Ser. No. 538,062, March 28, 1966, Pat. No. 3,639,152.

[52] U.S. Cl. ..................425/174, 425/432, 425/435, 264/23, 264/71
[51] Int. Cl. ................................................B29c 3/00
[58] Field of Search............18/2 Y, 5 H, 16 R, 16 H; 264/69, 71, 72; 425/174, 430, 435

[56] References Cited

UNITED STATES PATENTS

| | | | |
|---|---|---|---|
| 2,264,948 | 12/1941 | McKenzie | 264/69 |
| 2,962,785 | 12/1960 | Young | 264/69 X |
| 3,166,772 | 1/1965 | Bodine, Jr. | 15/22 |
| 3,239,005 | 3/1966 | Bodine, Jr. | 264/71 X |
| 3,240,847 | 3/1966 | Harshberger et al. | 264/71 |
| 3,383,439 | 5/1968 | Tully, Jr. et al. | 264/69 X |
| 3,526,686 | 9/1970 | Weinhold | 264/71 |
| 3,173,175 | 3/1965 | Lemelson | 425/435 X |

*Primary Examiner*—Robert L. Spicer, Jr.
*Attorney*—Sokolski & Wohlgemuth

[57] ABSTRACT

A plastic charge which may be in granular form, in the form of pellets, or in the form of a "fluff" material, is placed into a mold, which is closed off by means of a cover, mandrel or the like, for forming, and a bias force pressure applied thereto. High level sonic energy is generated by means of an orbiting mass oscillator which drives a resonant vibration system, the sonic energy being applied to the plastic charge to cause it to liquefy and flow uniformly throughout the mold to form a high strength plastic end product.

6 Claims, 6 Drawing Figures

PATENTED FEB 20 1973

INVENTOR.
ALBERT G. BODINE
BY
SOKOLSKI & WOHLGEMUTH
ATTORNEYS

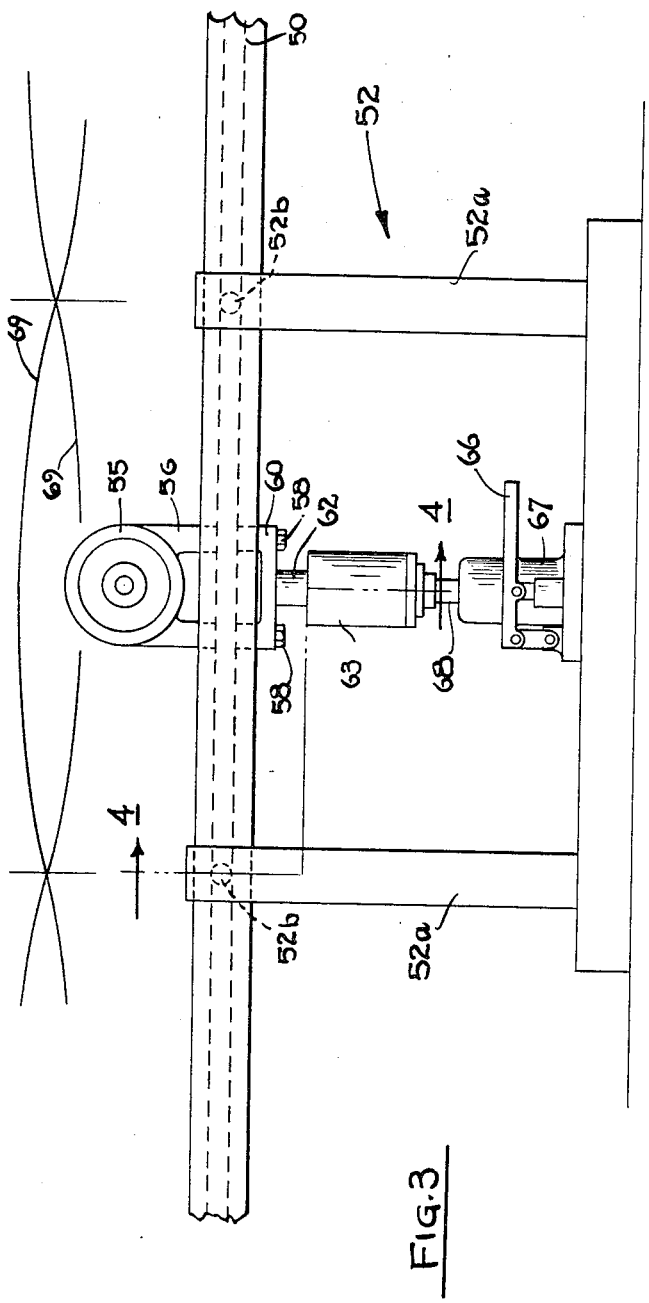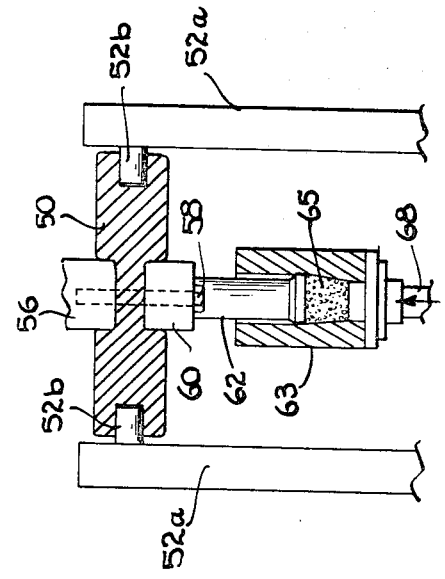

energy stored in each vibration cycle to the energy used in each such cycle. Q is mathematically equated to the ratio between $\omega M$ and $R_m$. Thus, the effective Q of the vibrating system can be maximized to make for highly efficient, high-amplitude vibration by minimizing the effect of friction in the system and/or maximizing the effect of mass in such system.

In considering the significance of the parameters described in connection with equation (1), it should be kept in mind that the total effective resistance, mass, and compliance in the acoustically vibrating system are represented in the equation and that these parameters may be distributed throughout the system rather than being lumped in any one component or portion thereof.

It is also to be noted that orbiting-mass oscillators are utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, the system automatically is maintained in optimum resonant operation by virtue of the "lock-in" characteristic of applicant's unique orbiting mass oscillators. Furthermore, in this connection the orbiting mass oscillator automatically changes not only its frequency but its phase angle and therefore its power factor with changes in the resistive impedance load, to assure optimum efficiency of operation at all times. The vibrational output from such orbiting mass oscillators also tends to be constrained by the resonator to be generated along a controlled predetermined coherent path to provide maximum output along a desired axis.

Referring now to FIGS. 1 and 2, a first embodiment of the invention is illustrated. Plastic charge material 32, which may be in granular form or in the form of pellets, is first placed within mold 30 as shown in FIG. 1. Mold 30 is supported on stand member 35 by means of isolator springs 36. Orbiting mass oscillator 39 is attached to the bottom of mold 30. This oscillator may be of the type described in my U.S. Pat. No. 2,960,314, or that described in connection with FIGS. 2 and 3 of my U.S. Pat. No. 3,233,012, mentioned above. In plasticizing the material, mold cover 40 is placed in position as shown in FIG. 2 and ram 42 lowered to provide biasing pressure on the material 32 within the mold. Oscillator 39 is then operated at a frequency such as to set up resonant elastic vibration of mold 30, thereby generating a standing wave vibration pattern in the mold as indicated by graph lines 44 and 45. The high lever sonic energy thus generated causes a random vibration of the particles of the plastic charge material, causing such material to rapidly fluidize and to flow uniformly throughout the mold. The sonic energy melds the particles together so they form a uniform mass with a highly effective intermixing of such particles being achieved. The bias pressure provided by ram 42 acting on cover 40 aids in the coupling of the acoustical energy from the mold to the charge material to make for more efficient utilization of such energy.

It is to be noted that in this embodiment the sonic energy acts primarily in a compressional mode, that is to say, the vibrations are principally in the up and down direction as looking at the figures. The sonic energy, as already noted, causes the molecules of the plastic to effectively intermix so as to form a high strength end product. It is to be noted that orbiting mass oscillator 39, as pointed out in the discussion earlier in the specification, automatically adjusts its frequency and phase so as to maintain optimum resonant vibration of the mold with changes in the load provided by the plastic material as the material is molded.

Referring now to FIGS. 3 and 4, another embodiment of the device of the invention is illustrated. Resonant bar member 50 is in the form of an I-beam and is supported on four post portions 52a of stand member 52. The post portions have pin members 52b which protrude therefrom and engate recesses formed in bar member 50. Orbiting mass oscillator 55 which may be of the same type as described in connection with the first embodiment is attached to bar member 50. Oscillator 55 has a bracket 56 fixedly attached thereto which fits in the top groove of the I formed by resonant bar 50 and which is attached to the bar by means of bolts 58. Also attached to bar 50 by means of bolts 58 is mandrel bracket 60 to which mandrel 62 is fixedly attached. Mandrel 62 fits into mold 63, the mold having plastic charge material 65 placed therein. Mold 63 is supported on hydraulic ram 68, this ram being actuated by means of handle 66 of hydraulic jack 67.

In operation, orbiting mass oscillator 55 is driven at a frequency such as to set up resonant standing wave vibrations of resonant bar member 50, as indicated by graph lines 69. The standing wave pattern is set up so that the nodes of the pattern appear along bar member 50 where pin members 52b engage the bar, so that a minimum amount of sonic energy is dissipated into stand 52. The high-level sonic energy is coupled through mandrel 62 to the plastic charge material 65 in the mold when hydraulic jack 67 is actuated to drive the mold upwardly, thereby causing a bias force to be applied by the mandrel on the charge material. As for the first embodiment, the sonic energy is applied to the charge in a compressional mode of operation causing rapid plasticizing of such material with the efficient melding of the particles thereof to form an end product having high structural integrity.

Referring now to FIG. 5, another embodiment of the invention is illustrated. This embodiment differs from the previously described embodiments in that a gyratory or torsional vibrational mode of operation is utilized. Orbiting mass oscillator 70 is supported on rubber isolator pad 71 on the base of support stand 72. This oscillator, which may be of the type described in my aforementioned U.S. Pat. No. 2,960,314, has a ring member 70a which is driven about center post 70b by means of an air stream fed to the oscillator through pneumatic line 72. Coupled to the casing of oscillator 70 is gyratory tube member 73, this tube member at the other end thereof being fixedly attached to mold 74. Mandrel 76 which fits into the mold is subtended from mandrel support frame 77. Mounted on the top of support frame 77 is hydraulic jack 78 which has a manual actuating handle 79 and a drive ram 80. Ram 80 abuts against plate 82 which in turn is connected to the top of stand 72 by means of rods 83. Thus when hydraulic jack 78 is actuated to cause ram 80 to drive against plate 82, a bias force is applied downwardly on mandrel 76. With bias pressure being applied by mandrel 76 on

SONIC APPARATUS FOR WORKING PLASTIC MATERIAL

RELATED U.S. APPLICATIONS

This application is a continuation in part of my copending application Ser. No. 845,865, filed July 29, 1969 now abandoned, of my application Ser. No. 538,062, filed Mar. 28, 1966 now U.S. Pat. No. 3,639,152, of which the aforementioned application Ser. No. 845,865 is a continuation in part, and of my application Ser. No. 454,335 filed May 10, 1965, now abandoned, of which Application Ser. No. 538,062 is a continuation in part.

In my U.S. Pat. No. 3,233,012, issued Feb. 1, 1966, the use of sonic energy to facilitate the making of plastic extrusions is described. As noted in this patent, the sonic energy tends to increase the fluidity or plasticity of the material, thus greatly enhancing the extrusion process. In my aforementioned application Ser. No. 845,865, of which the present application is a continuation in part, the utilization of sonic energy to facilitate the intimate bonding of plastic material with a fibrous core to form a high strength composite is described.

This invention relates to the use of sonic energy in plastic molding and more particularly to the molding of objects from plastic charges with a bias force being applied to the material while resonant sonic energy is applied thereto.

Plastic members may be molded with techniques of the prior art by placing a plastic charge which may be granular or pellet-like into a mold and then plasticizing the charge by simultaneously applying heat and pressure. It has been found with certain types of plastics that it is difficult to get a thorough and uniform flow of the plastic throughout the mold and a thorough melding or intermixing of the molecules of the charge material to form an integral structure of as high a structural integrity as to be desired. This invention is directed to overcoming these shortcomings of conventional plastic molding by utilizing high level sonic energy to implement the molding of the plastic charge whereby the resonant sonic vibrations applied to such material cause it to have a high degree of fluidity and flow throughout the mold, and further whereby such sonic energy causes a thorough intermixing of the molecules of the plastic to form an end structure of high structural integrity and strength. With high polymers of large molecular size, the sonic action of this invention gives an intertwining force, tending to "weave" the molecules.

It has been found that because of the high plasticizing action attained with the method and apparatus of this invention, it is possible to utilize plastic charges in forms which heretofore were not practical of utilization. Along these lines it has been found possible to use the plastic charge in the form of an initial raw fluff which results from the first formation of the molecules in certain types of plastic. It is to be noted that heretofore it has been necessary to convert this material to pellet form before it could be molded.

It is therefore the principal object of this invention to facilitate the molding of plastic material.

It is still a further object of this invention to provide an improved method and apparatus for molding plastic material wherein resonant sonic energy is utilized to plasticize a charge material placed in the mold.

It is still another object of this invention to improve the strength and structural integrity of molded plastic parts.

Other objects of this invention will become apparent as the description proceeds in connection with the accompanying drawings, of which:

FIG. 3 is an elevational view illustrating a second embodiment of the device of the invention;

FIG. 4 is a cross-sectional view taken along the plane indicated by 4—4 in FIG. 3;

Figure 2:
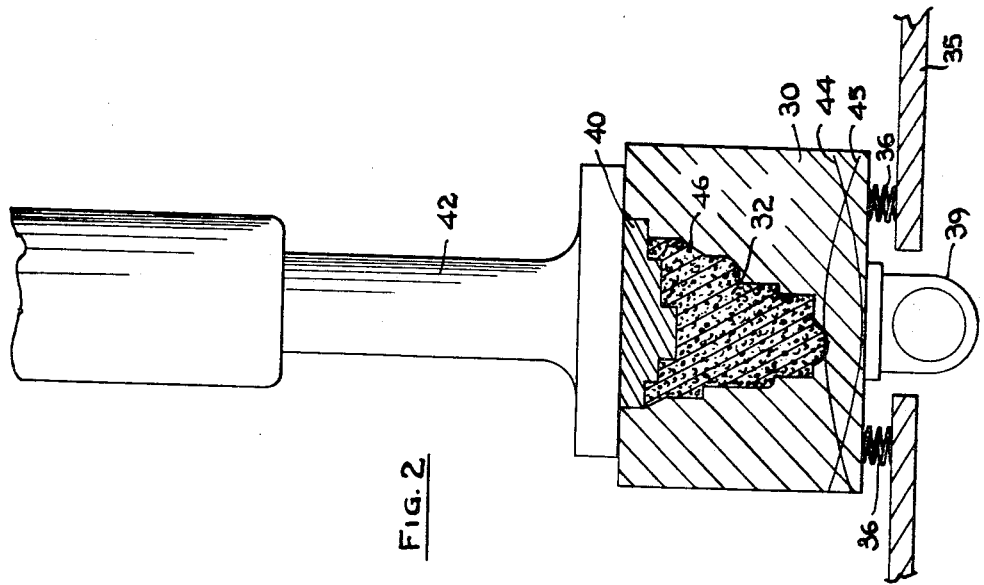
FIG. 2 is an elevational view of the embodiment of FIG. 1 operating to mold a part.
Figure 1:
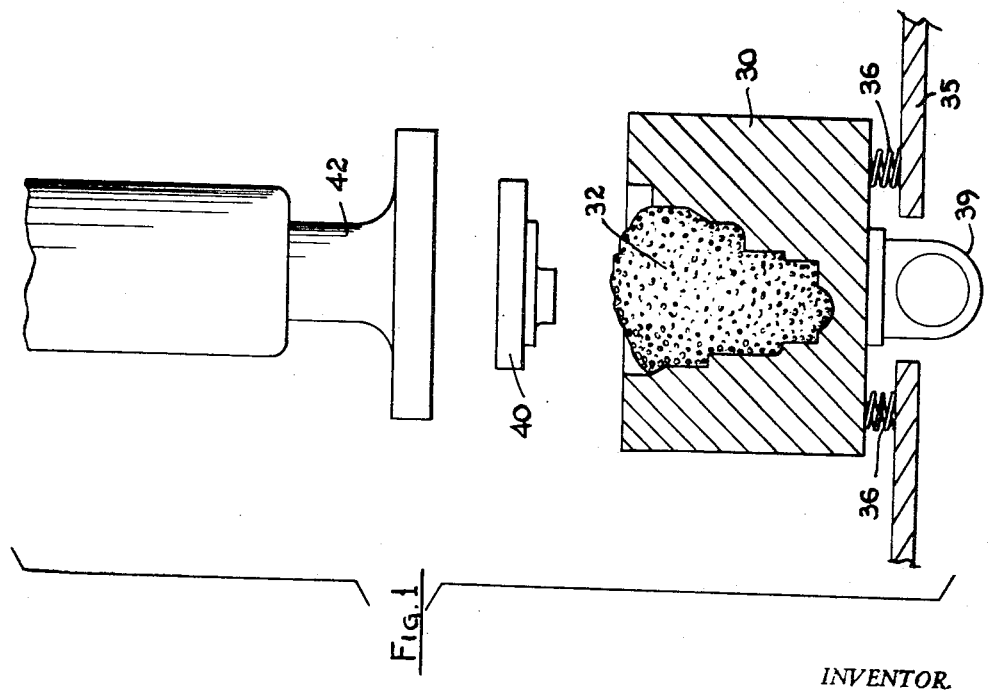
FIG. 1 is an exploded view illustrating a first method and apparatus of the invention.
Figure 5:
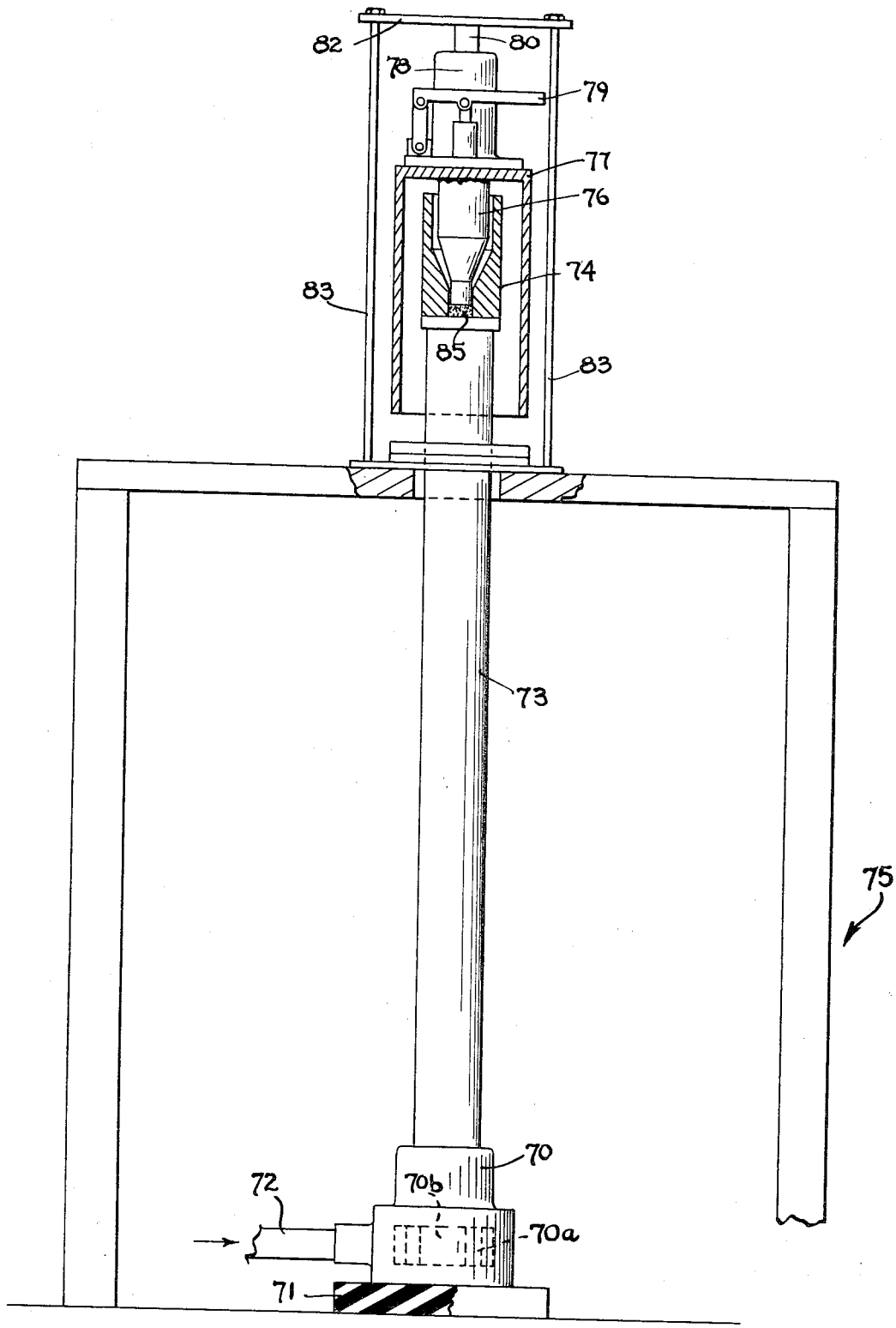
FIG. 5 is an elevational view of a third embodiment of the device of the invention.

Briefly described, the invention comprises a method and apparatus in which a plastic charge material in granular, pellet, or fluff form is placed into a mold or plasticizing cavity, and a biasing pressure applied thereto by means of a ram, jack, or the like. Sonic energy is generated by means of an orbiting mass oscillator and this sonic energy applied to a resonant vibration system which may include the mold and/or the pressure applying member. The sonic energy acts to plasticize the charge material causing it to flow uniformly through the mold or cavity, and whereby the molecules of the plastic material are thoroughly intermixed to form an end product of high structural integrity.

It has been found most helpful in analyzing this invention to analogize the acoustically vibrating circuit utilized to an equivalent electrical circuit. This sort of approach to analysis is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin\omega t$ ($\omega$ being equal to $2\pi$ times the frequency of vibration), that $$Z_m = R_m + j(\omega M - (1/\omega C_m)) = (F_o \sin\omega t/u) \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power. As for an equivalent electrical circuit, the Q of an acoustically vibrating system is defined as the sharpness of resonance thereof and is indicative of the ratio of the plastic charge material 85, oscillator 70 is operated at a frequency such as to set up a resonant gyratory vibration of tube member 73, the resonant vibrational energy being transferred from the tube to mold 74. With the gyratory vibration a rotating force vector is applied to the mold which describes a circular type motion which can be resolved into quadrature force vectors. This type of vibration provides especially good mixing action of the plastic particles which is particularly useful in plastics having a large molecular structure, such as the high polymers or high molecular weight plastics. This type of plastic has long stringy molecules which under ordinary types of molding tends to produce a grain type structure in the end product. This grain structure makes for a weakness of the formed part along the grain axis. The elimination of such grain structure by the molecular intermixing achieved with the twisting action of the technique and apparatus of this invention therefore affords a distinct improvement over the prior art.

Figure 6:
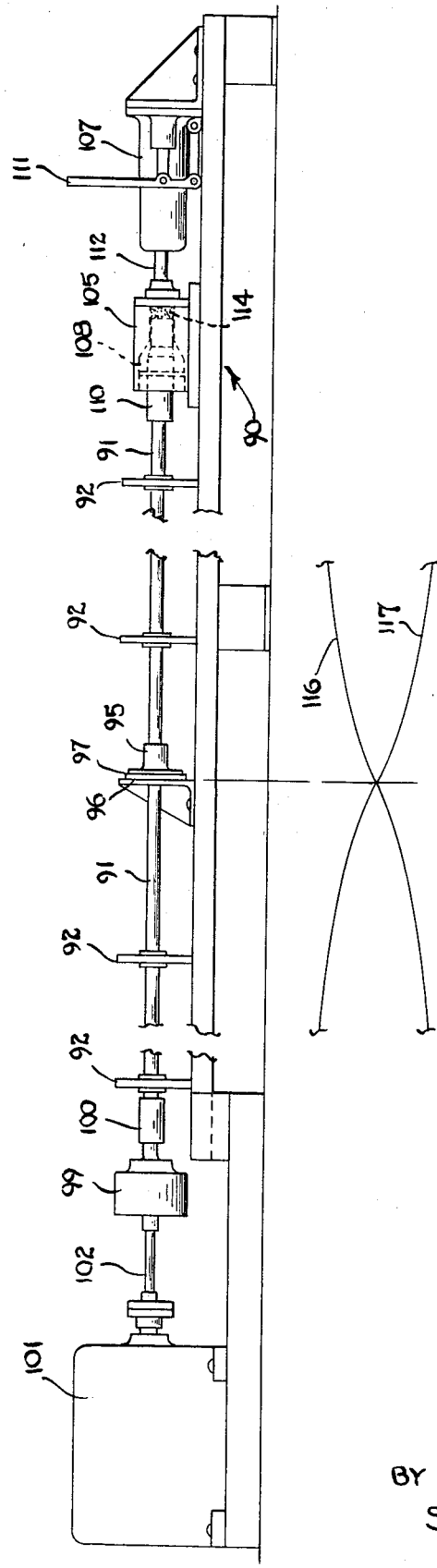
FIG. 6 is an elevational view of a fourth embodiment of the device of the invention.

Referring now to FIG. 6, another embodiment of the device of the invention is illustrated, this embodiment providing torsional vibration of the plastic material. Torsional rod 91 which may be of a flexible material such as steel is supported in bearing members 92 which are mounted on support stand 90. Bearing members 92 provide sleeve bearings for the torsion rod so as to permit torsional vibration thereof. A clamp member 95 is attached to the rod near the center thereof at a node of the torsional resonant vibration pattern. Stop member 96 is fixedly attached to stand 90 and has an aperture formed therein through which the torsional rod passes without making any contact with the stop member. Rubber isolation pad 97 is located between clamp 95 and stop member 96 to provide vibration isolation therebetween.

Orbiting mass oscillator 99, which may use multiple rotors, for generating a torque couple, of the type described in connection with FIGS. 2 and 3 of my aforementioned U.S. Pat. No. 3,233,012, has its casing attached to torsional rod 91 by means of clamp member 100. Oscillator 99 is rotatably driven by means of motor 101, the output shaft of which is coupled to the drive shaft 102 of the oscillator. Plastic mole 105 rests on stand 90 so that it is free to move along the stand in response to the drive force provided by hydraulic jack 107. Mandrel 108 is clamped to the end of rod 91 by means of clamp 110.

In operation, hydraulic jack 107 is actuated by means of lever 111 which causes the drive ram 112 of the jack to provide a longitudinal drive force to mold 105 whereby bias pressure is applied to the plastic material 114 contained in the mold. Mandrel 108 does not move in response to this force in view of the stop action against the motion of rod 91 provided by stop plate 96. The plastic material 114 is thus compressed between mandrel 108 and the inside walls of the mold. With bias pressure thus being applied against the plastic material, torsional oscillator 99 is driven by motor 101 at a speed such as to set up resonant standing wave vibration of torsional rod 91 as indicated by graph lines 116 and 117. This vibration is in a torsional or twisting mode in response to the vibratory torque output of the oscillator. The torsional vibrational energy is transferred to mandrel 108 resulting in a vibratory shear action in the annular space between the mandrel and the mold causing the plastic to be subjected to a very high damping force, this damping force being converted into heat energy. Further, the torsional vibrational energy is coupled to the plastic material and causes an intertwining of the molecular structure thereof to produce an end product having high strength. The bias force applied to the plastic material between the mandrel and the mold assures efficient coupling of the sonic energy to the plastic material. The material thus is uniformly plasticized and distributed throughout the mold to efficiently form a part having high structural integrity.

This invention thus provided means for improving the plastic molding of parts by utilizing sonic energy to plasticize the charge material, such sonic energy being efficiently coupled to the charge by the application of bias pressure between the sonic vibration system and the charge material.

I claim:

1. A device for forming plastic parts from plastic charge material comprising:
    mold member means for receiving the charge material,
    pressure applying means for providing a bias force against said charge material,
    an orbiting mass oscillator,
    a resonant vibration system including one of said afore mentioned means coupled to said oscillator to receive the vibrational output thereof, and
    means for driving said oscillator at a frequency such as to set up resonant elastic vibration of said vibration system whereby vibrational energy is passed from said vibration system to said charge material to mix and plasticize said material to form a uniform plastic mass therefrom.

2. The device of claim 1 wherein said vibration system comprises an elongated torsional resonator member, said pressure applying means comprising a mandrel positioned in said mold member means, said mandrel being coupled to said torsional resonator member.

3. The device of claim 1 wherein said vibration system comprises an elongated torsional resonator member, said pressure applying means comprising a jack member means driving said mold member, a mandrel positioned in said mold member means and connected to one end of said resonator member, said oscillator being connected to the other end of said resonator member and stop means connected to said resonator member for arresting movement of said resonator member along the longitudinal axis thereof.

4. The device of claim 1 wherein said resonant vibration system comprises said mold member means.

5. The device of claim 1 wherein said resonant vibration system comprises an elongated bar member, a standing wave pattern being set up in said bar member, and further including means for supporting said bar member at points therealong where the nodes of said standing wave pattern appear.

6. The device of claim 1 wherein said pressure applying means comprises an hydraulic jack having a ram drive, the ram drive of said jack being coupled to said mold member means to provide a drive force thereagainst.

* * * * *